United States Patent
Eriksson

[15] 3,642,450
[45] Feb. 15, 1972

[54] TEST STRIP PACKAGED-UNIT

[72] Inventor: Sven Axel Eriksson, Sodertalje, Sweden

[73] Assignee: AB Kabi, Stockholm, Sweden

[22] Filed: Jan. 6, 1970

[21] Appl. No.: 879

[30] Foreign Application Priority Data

Jan. 16, 1969 Sweden..................................585/69

[52] U.S. Cl. .........................................................23/253 TP
[51] Int. Cl. .......................................................G01n 31/22
[58] Field of Search....................23/253 TP, 253; 206/56 AA

[56] References Cited

UNITED STATES PATENTS 3,086,647  4/1963  Krezanoski .........................206/56 A2
3,232,710  2/1966  Rieckmann et al. ................23/253 TP Primary Examiner—Morris O. Wolk
Assistant Examiner—R. M. Reese
Attorney—A. A. Orlinger

[57] ABSTRACT

A packaged-unit comprising a sealed envelope of partible thermoplastic film material within which is enclosed an elongated absorbent test strip having an indicator portion subject to change in color by interaction with a sample to be tested. The envelope has an empty finger-gripping part extending beyond one end of the test strip and stopping means for it in the inner end of that part to restrain the strip from slipping into the empty end. The indicator part of the test strip is remote from the finger-grip part of the envelope. Intermediate the outer ends of the envelope and disposed in substantially oppositely aligned spaced-apart relationship with respect to each other are sealed welded parting lines each separately extending inwardly from its respective one of the elongated sides of the envelope. The parting lines enable the different parts of the envelope defined thereby to be pulled apart from one another along a line running through the parting lines when the end portions of the envelope are tightly gripped and pulled in opposite directions.

5 Claims, 7 Drawing Figures

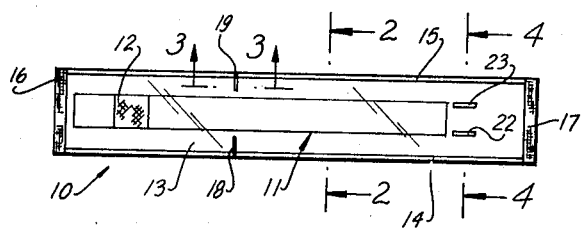
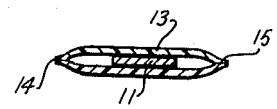
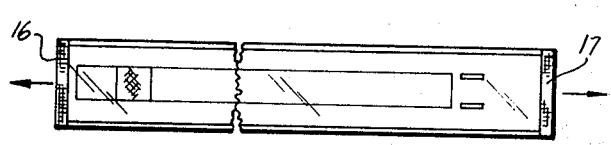
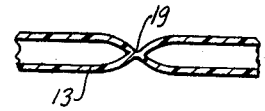
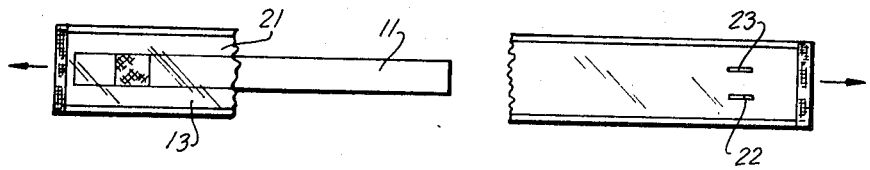
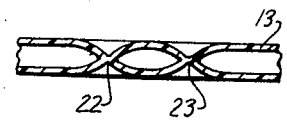
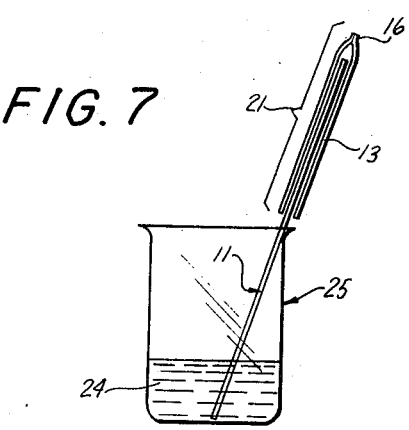
INVENTOR
SVEN AXEL ERIKSSON

TEST STRIP PACKAGED-UNIT

This invention is that of a test strip packaged-unit wherein an elongated absorbent test strip with a portion (briefly called the "color change or indicator portion") subject to color change provoked by contact with a sample to be tested is enclosed in a sealed envelope of partible thermoplastic film material. Intermediate the outer ends of the envelope are substantially oppositely aligned sealing welded parting lines longitudinally spaced apart from one another with each separately extending inwardly from its respective elongated side of the envelope.

The opposed welded parting lines enable the thereby marked off two different parts of the envelope to be pulled apart from one another along a line running through the opposed parting lines, when the ends of the envelope are separately tightly engaged and pulled in opposite directions. The then opened packaged-unit allows the thus exposed test strip freshly to contact a sample to be tested and the color change portion to be observed for any resulting effect.

Certain types of test strips used in various detection tests often are too readily sensitive to some one or another of deleterious constituents or possible contaminants in the ambient atmosphere, with consequent undesired reactive color change responsive to even slightly elevated amounts of any such reaction-provoking substances present in the air. That then causes less dependable test results to follow when the test strip has been exposed to the air even for a not very long period.

Then also, some test strips contain for their necessary analytical use, as in the color change portion, certain chemical substances which either may be adversely influenced by dampness or interfering materials present on the skin of, or alternatively when contacted may cause undesirable skin reactions to, some individuals who handle the strips in conducting tests with them.

The foregoing and other undesirable conditions and disadvantages are avoided by the test strip packaged-unit of this invention.

Considered broadly, the individual packaged-units of the invention include an elongated liquid-absorbent test strip having an indicator portion which can change in color by interaction with the content of some color-change-provoking substance in a sample to be tested, which test strip is enclosed in an elongated tightly sealed envelope of hand-pullably partible thermoplastic film material; and the envelope has intermediate its ends substantially oppositely aligned weld-sealed parting lines spaced apart from one another and with each separately extending inwardly from its respective elongated side of the envelope. The opposed weld-sealed parting lines enable the thereby marked off two parts of the envelope to be separated from one another along a line running through the opposed parting lines when the ends of the envelope are separately tightly engaged and pulled in opposite directions.

The envelope should be transparent at least in its area covering the indicator portion of the test strip to enable observing that portion, and desirably even entirely transparent. The end of the envelope remote from the indicator portion (and conveniently called the "nonindicating portion") of the test strip advantageously can extend outwardly beyond its end of the strip to an extent to avoid engaging that end of the strip upon grasping that end (i.e., thus the empty end) of the envelope between the fingers when pulling the ends of the envelope in opposite directions.

It is beneficial that the test strip be shorter than the interior length of the envelope so as to provide an empty end of it extending outwardly beyond the nonindicating end of the strip. Thus, the empty end of the envelope can include stopping means, such as one or more welded lines, adjacent that nonindicating end of the test strip to restrain it against moving into that empty, finger-engaging end of the envelope.

Provision of an empty part of the envelope at its nonindicating end presents a distinct advantage by enabling pulling apart the two originally continuous parts of the envelope, to expose the nonindicating portion of the test strip and to allow its indicator portion to remain covered by the other part of the envelope in which the indicator portion of the test strip was held fixed while its end of the envelope was grasped between the fingers when the envelope was being pulled apart and thereby severed at the line running between the aligned welded-parting lines.

Thus, a feature of the test strip packaged-unit of the invention is that the test strip is protected by the tightly sealed envelope against undesirable deleterious ingredient content of the ambient atmosphere.

A further feature is this ability to be pulled apart into the two separate portions of the envelop, which allows removing one part of the envelope to expose merely one portion of the test strip while its indicator portion still remains within the other part of the envelope. That serves to protect that part of the strip from the atmosphere but also from contamination by contact with the user's fingers, and also to protect the user from any possible undesirable effect from contact with any possibly harmful chemical content, such as aniline source chromogens, in the color change portion of the test strip.

Other features of the test strip packaged-unit of the invention will be noted from the below more detailed description of the invention in relation to a specific illustrative embodiment of it in the accompanying drawings in which:

FIG. 1 is a plan view of the intact complete test strip packaged-unit;

FIG. 2 is a transverse cross-sectional view along the line 2—2 of FIG. 1, with the opposed inside surfaces of the two separate walls of the envelope diagrammatically only shown out of contact with the respective surfaces of the test strip;

FIG. 3 is an enlarged fragmentary longitudinal sectional view transversely through one of the opposed welded parting lines;

FIG. 4 is an enlarged fragmentary transverse sectional view through the stopping or holding means adjacent the nonindicating end of the test strip;

FIG. 5 is a plan view similar to that of FIG. 1, but after starting of the pulling of the opposed outer ends of the envelope in opposite directions;

FIG. 6 is an expanded plan view like FIG. 5, but after the two parts of the envelope were pulled apart from one another with one of them still remaining over the indicator-holding portion of the test strip and with the other or nonindicating portion of the test strip completely exposed; and FIG. 7 shows the indicator portion of the test strip enclosed in a remaining enclosing part of the envelope with the exposed absorbent nonindicating portion of the strip immersed in a liquid sample held in a beaker.

The drawings (e.g., FIGS. 1, 2 and 5) show the test strip packaged-unit 10 with an absorbent test strip 11 having a color change or indicator portion 12 and entirely enclosed in envelope 13. The latter advantageously is prepared from entirely transparent hand-pullably partible thermoplastic film such as polyhydrocarbon thermoplastic film as polyethylene or polypropylene or other thermoplastic film such as cellulose acetate, polyamide, polyvinylchloride, polyvinylfluoride, or rubber hydrochloride films.

Envelope 13 can be prepared from a single longitudinal sheet double the width of the final sealed envelope and then folded over on itself across its width and heat sealed along its outer ends in the usual manner, and after insertion of the absorbent strip similarly being heat sealed along the open longitudinal side. Alternatively, as shown in the drawings envelope 13 can be prepared from two separate longitudinal sheets with one superimposed on the other with test strip 11 between them, and heat sealing the two sheets together along their adjacent longitudinal edges 14 and 15 respectively and then heat sealing their outer ends as at 16 and 17.

Substantially oppositely aligned sealing welded parting lines 18 and 19 are applied intermediate the outer ends 16 and 17, with each parting line extending inwardly from its respective outer longitudinal edges 14 and 15. Parting lines 18, 19 enable separating the envelope along a line between them into two separate parts when the outer ends 16 and 17 are grasped and pulled on in opposite directions from one another. Welded parting lines 18, 19 need not be fixed to the location shown in FIG. 1.

Instead they may be located elsewhere along their sides suitable to the nature of the test strip and how it is to be handled in use. For example, parting lines 18, 19 even could be located so much further to the right (as viewed in FIG. 1) that when envelope 13 is pulled apart (as shown in FIGS. 5 and 6), as much as even 90 percent of test strip 11 is enclosed by the indicator part 21 of envelope 13 so that only as little as 10 percent of the length of test strip 11 protrudes from the separated indicator part 21.

Heat-welded stop welds 22, 23 applied at the inner end of the empty end of the nonindicating part of envelop 13 and adjacent the nonindicating end of test strip 11 serve to restrain the strip with the outer end of its indicating portion quite close to the adjacent end-closing weld 16. Thereby the nonindicating end of test strip 11 is kept out of the empty end of envelope 13 and escapes being taken hold of when the empty end of envelope 13 is grasped between the fingers of one hand and its indicator part is grasped between those of the other hand and are pulled in opposite directions to separate envelope 13 into two pieces.

The indicator portion of test strip 11 thus is held fixed between the outer walls of envelope 13 at that end of strip 11 and so retained in indicator part 21 of the envelope after the two parts of the envelope have been pulled apart. The test strip with its indicator portion thus covered by indicator part 21 of envelope 13 then is ready for use with the indicator portion protected against any deleterious effect from contact with any contaminant on the fingers of the user. The latter similarly are protected against any deleterious effect from contact with any possibly harmful constituent of the indicator composition. The test strip with its thus-protected indicator portion then can be used, for example, by immersing its nonindicating portion in the test sample liquid 24 in beaker 25, and observing whether or not any color change develops in the color portion.

The individual test strip packaged-units of the invention can be produced by separately preparing the required type of test strip and interposing it between two separate elongated layers of the desired hand-pullably partible thermoplastic film, and heat-sealing and diecutting opposed longitudinal sides and outer ends of envelope size pieces of the film material.

The preparation of the test strips is only illustrated by, but not restricted to, that of the test strips disclosed in U.S. Pats. No. 3,005,714 columns 5-6 Example 2, No. 3,050,373 column 1 lines 34-37 and column 2 lines 23-34, No. 3,104,209 column 1 line 50 to column 2 line 22 and Example II in its columns 3-4, and No. 3,461,036 column 5 Example I to column 6 line 1.

The individual test strips such as any of those prepared and described in the patents just referred to, or any other test strip, can be enclosed separately each in its respective envelope, for example, by slightly modifying the heat-sealing and cutting die 46 in the apparatus shown in FIGS. 5-7 of, and using a method similar to that described in, U.S. Pat. No. 3,308,948 column 3 line 64 to its column 4 line 8 at the period and lines 16 to 26. In that apparatus, the shape of the raised sealing and cutting element 49 (shown in that patent FIG. 5) is changed to the elongated rectangular shape and size required for envelope 13.

Then suitably located intermediate the ends of the elongated sides of that rectangular shape is added suitably sized narrow heat-sealing fingers to enable providing the required sealing welded parting lines 18 and 19 for envelope 13. That sealing and cutting element 49 then is further modified by adding, at a location where there would be what is the inner end of the empty portion of envelope 13, a transverse member connected between the opposed sides of the element 49 and having on its upper face (as viewed in that patent FIG. 5) short, spaced-apart ridges to enable producing the welded stop welds 22 and 23 for envelope 13.

The method disclosed in the referred to part of U.S. Pat. No. 3,308,940 is to be modified to provide for the separate insertion of a single test strip at a time before the cutting and sealing operation which is carried out with the apparatus as shown in its FIGS. 6 and 7. For that the method of that patent is modified to include inserting a single test strip separately at a time by hand with tweezers (or by suitable automatic mechanical means) between the superposed layers 58 and 59 of thermoplastic film (shown in that FIG. 6).

The test strip is placed with the outer end of its indicator portion located about where numerals 62 and 63 occur in that figure. Then when films 58 and 59 are advanced to the left (as viewed in that FIG. 6) to the location where the part of each of them between the numerals 62 and 63 would arrive just to the right of wall 56 of that FIG. 6, the right-hand end of the test strip would be sufficiently to the left of the transverse member interposed between walls 52 and 59 to be missed by it when cutting die 46 is depressed.

When any test strips whose color change portion is readily adversely sensitive to some of the content of the workroom atmosphere are prepared by the foregoing method or otherwise, such test strips can be prepared and packaged in a controlled environment. Then the use of tightly sealing welding of the elongated sides and ends of the envelope and likewise of the welded parting lines safeguards such readily sensitive test strip in such resulting test strip packaged-unit from any adverse influence by undesirable humidity or other interfering constituent in the environment to which the sealed packaged-unit thereafter may be exposed.

In certain cases a relatively light color may develop in the color change portion of the test strip due to a low concentration of the specific materials sought for in the test sample or the nature of the specific color ordinarily developed from the chromogen constituent of the color change portion. In such cases it is advantageous that the remote wall of envelope 13, i.e., other than the transparent one through which the color change is observed, or at least the inner surface of that remote wall, be of such color that will facilitate the reading of the color change in the color change portion of test strip 11.

It is advantageous in the test strip packaged-unit of the invention that the sealing welded parting lines 18 and 19 do not weaken the thermoplastic film material to provide the lines at which parting will take place when tension is applied to envelope 13 by pulling its outer ends in opposite directions. That is accomplished by so shaping the required ridges used on the die to provide the parting lines that those ridges do not cut through the film but as a result of the heat-sealing temperature merely provide a suitable heat-seal at each of the two ridge-contacting locations.

Those skilled in the art can obtain or determine the thickness and tensile strength of the particular thermoplastic resin film to use for preparing envelope 13. For example, with a test strip of the type disclosed in the above-noted U.S. Pat. Nos. 3,005,714, 3,050,373, 3,104,209 and 3,461,036, the so-called low-density polyethylene film of 0.05 millimeters thickness provided a very dependable test strip packaged-unit. It was found that the tension needed to pull its envelope apart at the welded parting lines by pulling the ends of the envelope in opposite directions was in the order 1.1 to 1.4 kiloponds applied at a rate of 50 to 500 millimeters per minute. A film of 0.10 mm. thickness required 2.4 to 2.7 kp. These test strip packaged-units including test strips of the type shown by the just above-mentioned patents are particularly useful for testing by color reaction the presence or extent of presence of substances such as various of the sugars contained in voided, drawn or exuded body fluids such as urine, blood or serum. However, the complete test strip packaged-unit is not limited to include test strips for use with such liquids for they also may include test strips to be used in testing liquids or solutions of various kinds found in various laboratories and other activities.

The test strip conveniently may have merely an absorbent nonindicating portion continuous with a color change or indicator portion, for the absorbent nonindicating portion to be immersed alone in any liquid or solution which should not be contaminated by contact with any of the constituents of the color change or indicator portion.

As earlier indicated, it is advantageous for the test strip to be shorter than the internal length of the envelope so as to provide an empty portion of the envelope, which may be called the free finger-grip portion, extending outwardly beyond the end of the test strip remote from its indicator portion.

While the invention has been explained more fully by detailed description of certain specific embodiments of it, it is understood that various modifications and substitutions may be made in them within the scope of the appended claims which are intended to cover also equivalents of the specific embodiments.

What is claimed is:

1. A test strip packaged-unit comprising an elongated liquid absorbent test strip having an indicator portion subject to change in color by interaction provoked by a sample to be tested, said test strip being entirely enclosed in, and shorter than the inside length of, an elongated tightly sealed envelope having an empty finger-gripping part extending beyond one end of said test strip, and said indicator portion thereof being at its end remote from said finger-grip portion part of the envelope which latter is composed of hand-pullably partible thermoplastic resin film, and intermediate the outer ends of said envelope and substantially oppositely aligned, spaced apart from one another, sealing welded parting lines each separately extending inwardly from its respective one of the elongated sides of said envelope; said opposed welded parting lines enabling the thereby marked off two different parts of the envelope to be pulled apart from one another along a line running through said opposed parting lines when the end portions of said envelope are tightly engaged and pulled in opposite directions.

2. A test strip packaged-unit as claimed in claim 1, wherein the empty portion of said envelope includes stopping means in the inner end of said finger-gripping part of the envelope and outside of and adjacent the nearer end of said test strip, thereby to restrain said test strip from slipping into the empty end of the envelope.

3. A test strip packaged-unit as claimed in claim 1, wherein the hand-pullably partible thermoplastic resin film consists of polyethylene film of less than about 0.10 millimeter thickness requiring a tension to pull its envelope apart less than about 3 kiloponds applied at the rate of 50 to 500 millimeters per minute.

4. A test strip packaged-unit as claimed in claim 1, wherein there is a transparent wall of the envelope adjacent the indicator portion of said test strip.

5. A test strip packaged-unit as claimed in claim 4, wherein at least the inner surface of the other wall of said envelope so differs in color from the aforesaid transparent wall and the color change portion of the test strip as to enhance the color contrast of the reaction color change developed in said color change portion by the liquid tested.

* * * * *